United States Patent
Yokota et al.

(10) Patent No.: US 10,871,416 B2
(45) Date of Patent: Dec. 22, 2020

(54) CALIBRATION WORK SUPPORT DEVICE, CALIBRATION WORK SUPPORT METHOD, AND NON-TRANSITORY COMPUTER READABLE STORAGE MEDIUM

(71) Applicant: Yokogawa Electric Corporation, Tokyo (JP)

(72) Inventors: Yusuke Yokota, Tokyo (JP); Ryouhei Furihata, Tokyo (JP)

(73) Assignee: Yokogawa Electric Corporation, Musashino (JP)

( * ) Notice: Subject to any disclaimer, the term of this patent is extended or adjusted under 35 U.S.C. 154(b) by 331 days.

(21) Appl. No.: 15/963,485

(22) Filed: Apr. 26, 2018

(65) Prior Publication Data
US 2018/0313713 A1 Nov. 1, 2018

(30) Foreign Application Priority Data
Apr. 28, 2017 (JP) .................................. 2017-090800

(51) Int. Cl.
*G01L 27/00* (2006.01)
(52) U.S. Cl.
CPC .......... *G01L 27/005* (2013.01); *G01L 27/002* (2013.01)

(58) Field of Classification Search
CPC .................................................... G01L 27/005
See application file for complete search history.

(56) References Cited

U.S. PATENT DOCUMENTS

2006/0208205 A1* 9/2006 Chen ...................... G03F 7/705
250/492.22

FOREIGN PATENT DOCUMENTS

| EP | 1688795 A2 | 8/2006 |
|---|---|---|
| JP | 63-126006 A | 5/1988 |
| JP | 2-281120 A | 11/1990 |
| JP | 2005-92852 A | 4/2005 |
| JP | 2014-238361 A | 12/2014 |

\* cited by examiner

*Primary Examiner* — Manuel A Rivera Vargas
(74) *Attorney, Agent, or Firm* — Sughrue Mion, PLLC

(57) ABSTRACT

A calibration work support device includes a calibration target setter configured to set a target value of a simulation signal that is input to a device in calibration of the device and an input order of the target value in the calibration, a simulation signal acquirer configured to acquire an input value based on the simulation signal input to the device, a graph generator configured to generate a graph indicating a transition of the target value set by the calibration target setter and the input value acquired by the simulation signal acquirer, and a data output unit configured to output the graph generated by the graph generator.

20 Claims, 5 Drawing Sheets

CALIBRATION WORK SUPPORT DEVICE, CALIBRATION WORK SUPPORT METHOD, AND NON-TRANSITORY COMPUTER READABLE STORAGE MEDIUM

BACKGROUND

Technical Fields

The present invention relates to a calibration work support device, a calibration work support method, and a non-transitory computer readable storage medium.

Priority is claimed on Japanese Patent Application No. 2017-090800, filed Apr. 28, 2017, the contents of which are incorporated herein by reference.

Related Art

In the related art, in plants such as industrial plants such as chemical plants, plants that manage and control wellheads such as gas fields or oil fields, or the surroundings thereof, plants that manage and control power generation such as hydraulic power, thermal power, nuclear power, or the like, plants that manage and control renewable power such as solar power, wind power, or the like, plants that manage and control sewage, dams, or the like, factories, or the like (hereinafter collectively referred to as a "plant"), a distributed control system (DCS), a supervisory control and data acquisition (SCADA) system, or the like has been built, and advanced automatic operation thereof has been realized. In DCS and SCADA, field devices, such as a measuring device or an operating device, and a control device that controls the field devices are connected via a communication means.

In such a control system, it is possible to maintain soundness indicating that an operation or accuracy of the field devices is normal by calibrating and adjusting the field devices installed in the plant. Calibration work for a field device is performed, for example, by inputting a simulated input (simulation signal) in which an operation state of the field device is assumed, to a field device that is a calibration target and confirming whether or not an output value corresponding to a value (magnitude) of the simulation signal is in an allowable range determined in an operation situation or how much the output signal deviates from the allowable range.

The value of the simulation signal is determined by the field device that is a calibration target in advance. The value of the simulation signal includes, for example, five points including a lower limit value and an upper limit value of a measurement range. A worker who performs the calibration work adjusts the value of the simulation signal to a predetermined value and records an output value with respect to the adjusted input value. The adjustment of the input value is performed, for example, by operating a manual pump that generates a pressure. The worker adjusts the amount of operation of the manual pump so that the pressure has a predetermined input value while visually confirming a numerical value displayed on a calibrator that measures the pressure (see, for example, Japanese Unexamined Patent Application Publication No. 2014-238361).

However, in the calibration work of the related art, the adjustment of the input value is performed manually by a worker. Accordingly, for example, in a field device of which an output value changes with a magnitude of a change in an input value, calibration results are influenced by variation in the manual work of the worker such as the amount of operation of the pump, and the calibration accuracy may decrease in some cases.

Further, since the value of the simulation signal is adjusted while confirming the numerical value displayed on the calibrator, the adjustment work takes time and working efficiency is degraded in some cases.

SUMMARY

A calibration work support device may include a calibration target setter configured to set a target value of a simulation signal that is input to a device in calibration of the device and an input order of the target value in the calibration, a simulation signal acquirer configured to acquire an input value based on the simulation signal input to the device, a graph generator configured to generate a graph indicating a transition of the target value set by the calibration target setter and the input value acquired by the simulation signal acquirer, and a data output unit configured to output the graph generated by the graph generator.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a calibration work support device, a calibration work support method, and a non-transitory computer readable storage medium in which calibration accuracy and work efficiency are able to be improved.

Hereinafter, a calibration work support device, a calibration work support method, a calibration work support program, and a recording medium according to an embodiment of the present invention will be described in detail with reference to the drawings.

Figure 1:
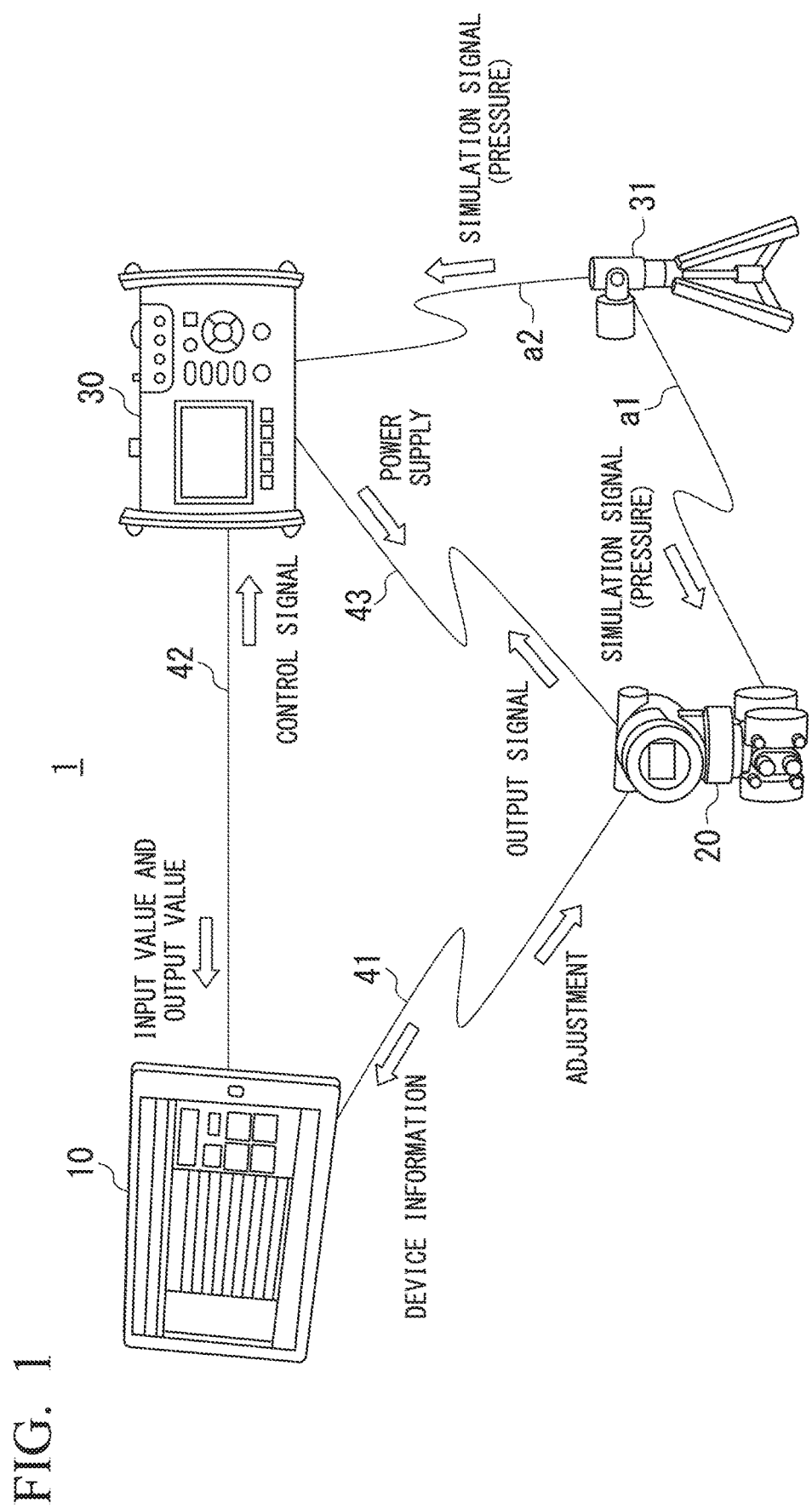
FIG. 1 is a block diagram illustrating an example of a configuration of a calibration work support system including a calibration work support device in an embodiment.

First, a configuration of the calibration work support system will be described with reference to FIG. 1. FIG. 1 is a block diagram illustrating an example of a configuration of a calibration work support system including a calibration work support device according to the embodiment.

In FIG. 1, the calibration work support system 1 includes a calibration work support device 10, a pressure gauge 20, a pressure calibrator 30, and a pressure generator 31. The calibration work support device 10 is connected to the pressure gauge 20 via a cable 41. The calibration work support device 10 is connected to the pressure calibrator 30 via a cable 42. The pressure gauge 20 is connected to the pressure calibrator 30 via a cable 43. The pressure generator 31 and the pressure gauge 20 are connected by an air tube a1. The pressure generator 31 and the pressure calibrator 30 are connected by an air tube a2.

The calibration work support device 10 is a device that supports calibration work of the pressure gauge 20 illustrated as a field device. That is, the pressure gauge 20 is a device which is to be calibrated. First, calibration work of the pressure gauge 20 will be described.

The calibration work is work of calibrating a device, which is performed by a maintenance worker who maintains a field device, and it is possible to confirm he soundness of a field device by performing the calibration work. In the calibration of a device, a simulation signal is input to a device, and it is confirmed whether an error in a value of an output signal (an output value) with respect to the simulation signal is in a predetermined allowable range. A simulation signal with a predetermined value is input to the device. The predetermined value of the simulation signal in the calibration is referred to as a calibration point. In the calibration work, the simulation signal is adjusted to be the calibration point, and the simulation signal and the output value from the device according to the value of the simulation signal are recorded. The calibration is performed at one or a plurality of calibration points. The number of points for the calibration points (the number of calibration points) and the value of the simulation signal are determined by a calibration target device in advance. In the calibration, it is confirmed whether or not an error of the output value at each calibration point is in an allowable range. For example, when there are five points for the calibration points, the error of the output value at each of the five calibration points is confirmed. Note that, setting of calibration points in the calibration work is defined in, for example, JIS C 1803-1995 (General rules for defining expression of the performance of industrial-process measurement and control equipment), or the like. In the calibration work of the pressure gauge 20, the simulation signal uses the pressure (air pressure) generated by the pressure generator 31.

The pressure generator 31 generates a predetermined pressure in accordance with an operation of a maintenance worker. The pressure generator 31 may be, for example, a hand pump that generates pressure as a piston is slid by the maintenance worker manually operating a handle. The pressure generated by the pressure generator 31 is input to the pressure gauge 20 as a simulation signal via the air tube a1 and is input to the pressure calibrator 30 via the air tube a2. In the embodiment, it is assumed that the air tube a1 and the air tube a2 have a length and an inner diameter such that a pressure difference in the tube can be neglected. The maintenance worker adjusts the pressure that is generated according to the number of operations of the handle of the manual pump, the amount of operation, or the like, and inputs a predetermined pressure to the pressure gauge 20 as a simulation signal.

The pressure gauge 20 outputs an output value according to the simulation signal (pressure) input from the pressure generator 31, to the pressure calibrator 30 via the cable 43. The pressure gauge 20 outputs an output value (Measure) according to an input pressure (Source) to the pressure calibrator 30. The pressure gauge 20, for example, outputs an output value of an analog current value such as 4 to 20 mA or an analog voltage value of 1 to 5 V in a range of a preset input (pressure).

The pressure calibrator 30 supplies power to the pressure gauge 20, acquires an output value at the calibration point from the pressure gauge 20, and records the output value together with the input value based on the simulation signal. The simulation signal in the calibration of the pressure gauge 20 is a pressure of the simulation signal measured by the pressure calibrator 30 and the input value based on the simulation signal is information indicating the pressure of the simulation signal measured by the pressure calibrator 30. The pressure calibrator 30 can record, for example, an input value (KPA) and an output value (mA) in association with each other.

Further, the pressure calibrator 30 outputs the input value based on the simulation signal and the output value acquired from the pressure gauge 20 to the calibration work support device 10 via the cable 42 in association with each other. The input value based on the simulation signal and the output value acquired from the pressure gauge 20, for example, are synchronously output and associated with each other. The pressure calibrator 30 and the calibration work support device 10, for example, can be connected to each other bi-directionally communicably through serial communication of a predetermined communication standard. The pressure calibrator 30 converts the input value based on the simulation signal and the output value acquired from the pressure gauge 20 into a serial signal that is used for communication with the calibration work support device 10 and transmits the serial signal.

Further, the pressure calibrator 30 may receive a control signal from the calibration work support device 10. The control signal is a signal for controlling an operation of the pressure calibrator 30. The pressure calibrator 30 may receive a control signal equivalent to an operation of a switch or the like included in the pressure calibrator 30. For example, the pressure calibrator 30 includes a switch "Record" for recording the input value and the output value at the calibration point. The pressure calibrator 30 may receive a control signal equivalent to a time when the recording switch has been operated from the calibration work support device 10 through the control signal.

In addition, for example, the pressure calibrator 30 may be configured such that the number of calibration points and the ascending or descending pattern of the calibration points may be preset. The number of calibration points is a predetermined number necessary for calibration of the device to be calibrated, as described above. In addition, the ascending or descending pattern of the calibration points sets the output signals to be recorded sequentially in ascending order of the calibration points from 0% to 100% (Up), in descending order from 100% to 0% (Down), or back and forth such as from 0%→100%→0% (Up and Down). By determining the number of calibration points and the ascending or descending pattern, a recording order of the output signals at the calibration points is uniquely determined. For example, when the number of calibration points is 1 and the ascending or descending pattern is Down, the calibration point is a point at which the input value is 100%. Also, when there are 5 calibration points and the ascending or descending pattern is Up/Down, the calibration points are points in the input value order of 0%→50%→100→%50→%0%.

The calibration work support device 10 acquires the input value based on the simulation signal and the output value acquired from the pressure gauge 20 in association with each other from the pressure calibrator 30 via the cable 42. The calibration work support device 10 performs calibration based on the acquired input value and the acquired output value. For example, the calibration work support device 10 generates a reference value for calibration that can be compared with the output value, based on the acquired input value. The reference value is an output value serving as a reference when a predetermined pressure is input. The reference value is calculated, for example, from a relational expression illustrating a relationship between a predetermined pressure and an output value. The calibration is determined based on whether a difference (error) between the reference value and the output value acquired from the pressure gauge 20 is in an allowable range. The calibration work support device 10 calculates an error at each calibration point and performs calibration. It should be noted that the calibration work supporting apparatus 10 may be configured such that the allowed magnitude of the error is set as the allowable range.

Further, the calibration work support device 10 may communicate with the pressure gauge 20, for example, through field communication such as ISA 100, HART (registered trademark), BRAIN (registered trademark), FOUNDATION Fieldbus, or PROFIBUS via the cable 41. The calibration work support device 10 can acquire parameters of the pressure gauge 20 using a command for the field communication. The parameters can include device information such as a device ID of the pressure gauge 20, a tag name, a range of the input value, or a range of the output value. Further, the parameter may include a current value of the output signal, or the like. Further, the calibration work support device 10 may perform a parameter setting or zero-point adjustment of the pressure gauge 20 through the field communication.

Further, the calibration work support device 10 may transmit a control signal to the pressure calibrator 30. For example, the calibration work support device 10 can generate an operation unit equivalent to an operation unit of the pressure calibrator 30 on a touch panel and transmit an operation of the touch panel to the pressure calibrator 30 as a control signal. The calibration work support device 10 may output, for example, an operation for progressing recording of the calibration points in a preset input order as a control signal, in addition to the switch "Record" described above. Note that details of the functions of the calibration work support device 10 will be described below with reference to FIG. 2.

Figure 2:
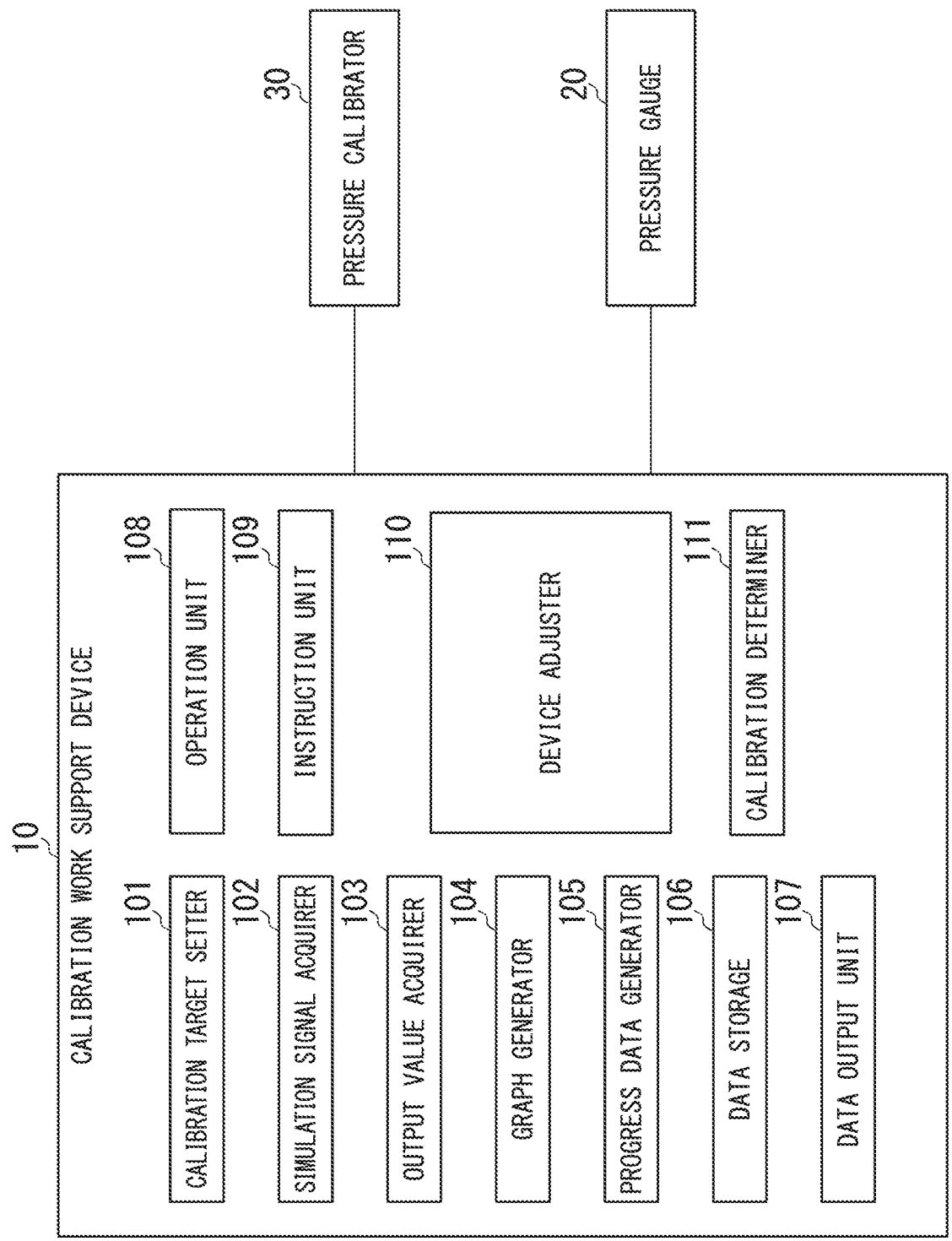
FIG. 2 is a block diagram illustrating an example of a software configuration of the calibration work support device in the embodiment.

Next, a software configuration of the calibration work support device 10 will be described with reference to FIG. 2. FIG. 2 is a block diagram illustrating an example of the software configuration of the calibration work support device 10 according to the embodiment.

In FIG. 2, the calibration work support device 10 includes respective functions of a calibration target setter 101, a simulation signal acquirer 102, an output value acquirer 103, a graph generator 104, a progress data generator 105, a data storage 106, a data output unit 107, an operation unit 108, an instruction unit 109, a device adjuster 110, and a calibration determiner 111. The calibration work support device 10 is communicably connected to the pressure gauge 20. Further, the calibration work support device 10 is communicably connected to the pressure calibrator 30.

The respective functions of the calibration work support device 10 in the embodiment will be described as function modules that are realized by a calibration work support program (software) that controls the calibration work support device 10.

The calibration target setter 101 enables a setting of target values (a calibration point) of the simulation signal that is input to the pressure gauge 20 in the calibration of the pressure gauge 20, and an input order of the target values in the calibration (a recording order of the calibration points). The calibration points and a recording order of the calibration points is hereinafter referred to as "calibration point information". The calibration target setter 101 may set, for example, the information of the calibration point set in the pressure calibrator 30 using the same method as the pressure calibrator 30. Specifically, the calibration target setter 101 may set the number of calibration points and the ascending or descending pattern. The calibration target setter 101 may set the same information on the calibration points as that on the calibration point set in the pressure calibrator 30. For example, the calibration target setter 101 may read the information on the calibration point set in the pressure calibrator 30 from the pressure calibrator 30 and set the information. Further, the calibration target setter 101 may provide the information on the calibration point set in the calibration target setter 101 to the pressure calibrator 30. By setting the same information as that on the calibration point set in the pressure calibrator 30, calibration work using the pressure calibrator 30 can be supported in the calibration work support device 10.

The simulation signal acquirer 102 acquires the input value based on the simulation signal from the pressure calibrator 30. The simulation signal acquirer 102 acquires the input value using, for example, a serial signal.

The output value acquirer 103 acquires, from the pressure calibrator 30, an output value that is output from the pressure gauge 20 according to the simulation signal input to the pressure gauge 20. The output value is output by the pressure calibrator 30 converting the analog value input from the pressure gauge 20 into a serial signal. That is, in the embodiment, the input value based on the simulation signal acquired in the simulation signal acquirer 102 and the output value acquired in the output value acquirer 103 can be acquired using the serial signal that is output from the pressure calibrator 30. Therefore, the simulation signal acquirer 102 and the output value acquirer 103, for example, may be combined into one functional unit.

The graph generator 104 generates a graph showing the target values set in the calibration target setter 101 and a transition of the input values based on the simulation signal acquired in the simulation signal acquirer 102.

The graph generator 104 generates, for example, a graph in which a horizontal axis indicates a time when the input values have been acquired in the simulation signal acquirer 102, and a vertical axis indicates the input values based on the simulation signal acquired in the simulation signal acquirer 102. The target values set in the calibration target setter 101 are generated, for example, as horizontal lines on a graph showing a predetermined input value. The target value set in the calibration target setter 101 transitions according to the recording order of the calibration points, as described above. For example, it is assumed that the calibration points are set in an order of 0%→50%→100%→50%→0%. First, it is assumed that recording at the first calibration point at which the target value is 0% is completed. In this case, the target value for the next calibration point is 50%. The graph generator 104 generates a new target value of 50% as a horizontal line on the graph.

The graph generator 104 generates a graph in which the transition of the input value acquired in the simulation signal acquirer 102 is plotted in time series. For example, when the input value based on the simulation signal increases due to the operation of the maintenance worker, the graph generator 104 generates a graph showing an increase in the input value. The amount by which the maintenance worker increases or decreases the simulation signal is shown in the graph. For example, when the maintenance worker rapidly increases or decreases the simulation signal, a slope of the graph increases, whereas when the maintenance worker slowly increases or decreases the simulation signal, the slope of the graph decreases. That is, the maintenance worker can recognize a difference between the input value and the target value and a transition in which the input value approaches the target value by viewing the graph generated in the graph generator 104. For example, the maintenance worker can adjust the amount of operation of the pressure generator 31 by recognizing a difference from the target value and the slope of the graph. Accordingly, for example, it is possible to shorten the time taken to set the input value to the target value and to prevent the target value from being exceeded. That is, the maintenance worker can appropriately operate the pressure generator 31 to set the simulation signal to the target value. By the worker appropriately operating the pressure generator, for example, it is possible to prevent occurrence of re-calibration or the like, and to improve the calibration accuracy and working efficiency.

The progress data generator 105 generates progress data indicating a progress situation of the calibration in an input order of the calibration points set in the calibration target setter 101. The progress data generator 105 generates the progress data in a list form of an input schedule and an input result of the simulation signal. For example, when the calibration points are set in an order of 0%→50%→100%→50%→0%, the progress data generator 105 generates the input schedule of the simulation signal in the form of a list, and sequentially updates the recorded input results. That is, the progress data generator 105 generates display data that allows the user to see to which calibration point the calibration has been completed. For example, by the progress data generator 105 displaying, at the respective calibration points, the output values at the calibration points at which the recording has been completed, the maintenance worker visually can recognize the calibration point at which the output value is not displayed and recognize the progress of the calibration.

The data storage 106 stores data. The data storage 106 stores data of at least any one of the target value set in the calibration target setter 101, the input order set in the calibration target setter 101, the input value based on the simulation signal acquired in the simulation signal acquirer 102, the output value acquired in the output value acquirer 103, the graph generated in the graph generator 104, and the progress data generated in the progress data generator 105. The data storage 106 stores a calibration history in which any of the above-described data and information on the devices are included. The calibration history may include, for example, information such as a performance date and time of the calibration work, the maintenance worker, a result of the calibration, an action performed or scheduled to be performed, a memo of the maintenance worker, and an image captured by a camera. Note that the information on the device can be acquired by, for example, the device adjuster 110 to be described below. The information on the device may include a manual input of the maintenance worker, reading information of a two-dimensional code attached to the device, and the like. By storing the information on the device together, it is possible to facilitate use of the stored data. For example, it is possible to search for the stored data using a device ID and analyze data for a device specified using the device ID that has been searched for. The calibration history stored in the data storage 106 may be output from the data output unit 107. By outputting the calibration history, it is possible to manage the calibration history in a management server (not illustrated) or the like.

The data output unit 107 outputs the generated graph and the generated progress data. For example, the data output unit 107 outputs the generated graph and the generated progress data as display data for a display on the display device. Further, the data output unit 107 may output the generated graph and the generated progress data as print data for output to a printer, transmission data for transmission to another computer via a communication line, and the like.

The data output unit 107 may output the calibration history stored in the data storage 106. For example, the data output unit 107 may output the calibration history stored in the data storage 106 as a report in a predetermined format.

The operation unit 108 enables a recording operation of recording the output value output from the pressure gauge 20 according to the simulation signal. For example, it may be assumed that the operation unit 108 will perform a recording operation when detecting that a maintenance worker has operated a button able to be operated. The operable button may be displayed, for example, on a touch panel.

The instruction unit 109 instructs recording of the output value output from the pressure gauge 20 when a recording operation is performed in the operation unit 108. The instruction for recording can be issued to the pressure calibrator 30. In the embodiment illustrated in FIG. 1 or 2, the case in which the calibration work support device 10 does not have the function of the pressure calibrator 30 has been illustrated. Accordingly, the instruction unit 109 instructs the pressure calibrator 30 to record the output value via the cable 42. However, when the calibration work support device 10 has the function of the pressure calibrator 30, the instruction unit 109 instructs the function of the pressure calibrator 30 to record the output value.

The device adjuster 110 has a function of adjusting and setting the pressure gauge 20 illustrated as a field device. For example, the device adjuster 110 can read a device information (parameter) set in the pressure gauge 20 and change the device information set in the pressure gauge 20 or set the device information in the pressure gauge 20. The device adjuster 110 may have a function of recording the device information of the pressure gauge 20. Further, the device adjuster 110 may have a function of supporting an input loop test, a function of adjusting a zero point, a function of creating a report, and the like. By having the functions of the device adjuster 110, the calibration work support device 10 can perform adjustment or setting of the field device and calibration work of the field device and improve workability. For example, the device adjuster 110 may adjust the zero point of the field device on the basis of a result of the calibration performed in the pressure calibrator 30. By using the calibration result for the adjustment of the zero point of the field device, it is possible to reduce the number of adjustments. By having the function of the device adjuster 110, the calibration work support device 10 can improve the work efficiency of the calibration work and improve the work efficiency of the adjustment work.

The calibration determiner 111 makes a determination as to the calibration. The calibration determiner 111 generates a determination result on the basis of the input value based on the simulation signal that the simulation signal acquirer 102 has acquired from the pressure calibrator 30 at the calibration point and the output value of the pressure gauge 20 that the output value acquirer 103 has acquired from the pressure calibrator 30. For example, the calibration determiner 111 generates a reference value for calibration that can be compared with the output value, on the basis of the acquired input value. As described above, the reference value is an output value serving as a reference when a predetermined pressure is input. The calibration determiner 111 determines whether or not a difference (error) between the generated reference value and the acquired output value is in the allowable range. When the calibration determiner 111 determines that the calculated difference is in the allowable range, the calibration determiner 111 generates the determination result "PASS" at the calibration point. On the other hand, when the calibration determiner 111 determines that the calculated difference is not in the allowable range, the calibration determiner 111 generates the determination result "FAIL" at the calibration point. For example, when the determination result "PASS" is generated at all the calibration points, the calibration determiner 111 may generate the determination result that the calibration is passed. When a magnitude of the error in the allowable range is preset, the calibration determiner 111 may acquire the set allowable range and generate the determination result.

Note that the determination result generated by the calibration determiner 111 may be reflected in the graph generated in the graph generator 104 or the progress data generated by the progress data generator 105. For example, the progress data may include the determination result "PASS" or "FAIL". Further, the determination result generated by the calibration determiner 111 may be stored in the data storage 106 or may be output from the data output unit 107.

Further, the case in which one calibration work support device 10 is connected to each one of the pressure gauge 20 and the pressure calibrator 30 has been illustrated in FIG. 2, but the number of connected pressure gauges 20 or pressure calibrators 30 connected to the calibration work support device 10 is arbitrary.

Further, the functions of the calibration target setter 101, the simulation signal acquirer 102, the output value acquirer 103, the graph generator 104, the progress data generator 105, the data storage 106, the data output unit 107, the operation unit 108, the instruction unit 109, the device adjuster 110, and the calibration determiner 111 included in the calibration work support device 10 are realized by software as described above. However, at least one of the functions of the calibration work support device 10 may be realized by hardware.

Further, any of the functions of the calibration work support device 10 may be implemented by dividing one function into a plurality of functions. Further, any two or more of the functions of the calibration work support device 10 may be integrated into one function and implemented.

Further, the calibration work support device 10 may be a device that is realized with one casing or may be a system that is realized from a plurality of devices connected via a network or the like. For example, the calibration work support device 10 may be a virtual device such as a cloud service that is provided by a cloud computing system. Further, the calibration work support device 10 may be a general-purpose computer such as a server device or may be a dedicated device with limited functions.

Further, at least one of the above-described functions of the calibration work support device 10 may be realized in another device. That is, the calibration work support device 10 need not have all of the above functions and may have some of the functions.

Figure 3:
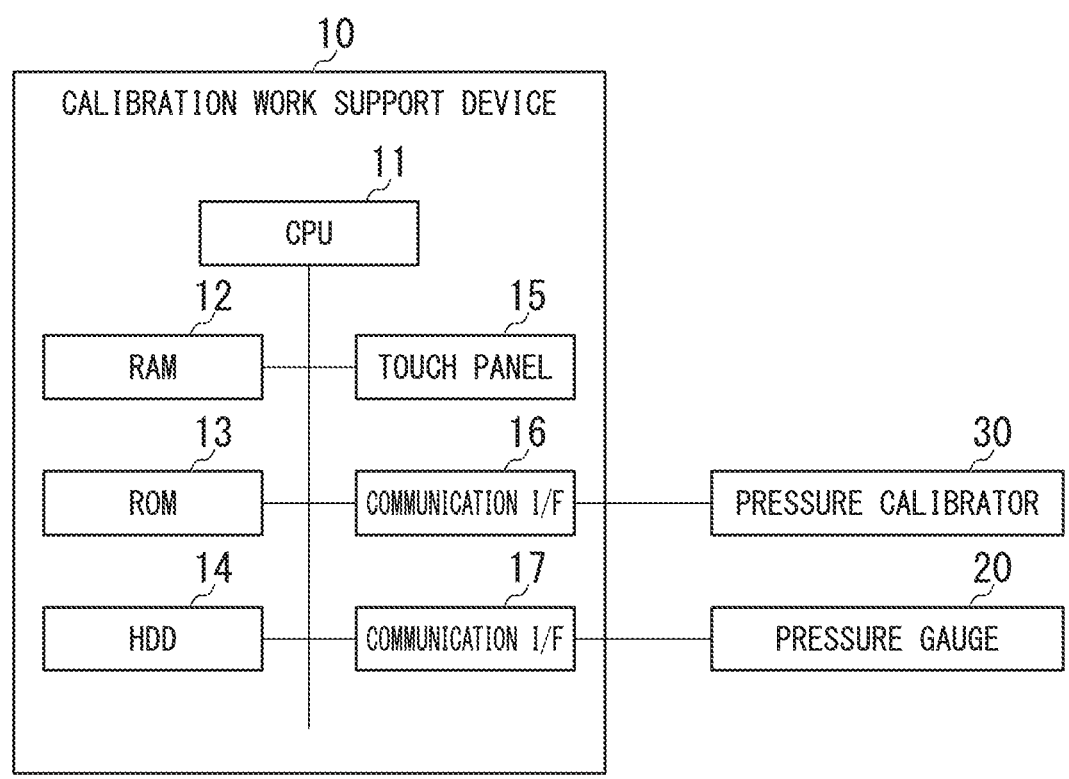
FIG. 3 is a block diagram illustrating an example of a hardware configuration of the calibration work support device in the embodiment.

Next, a hardware configuration of the calibration work support device 10 will be described with reference to FIG. 3. FIG. 3 is a block diagram illustrating an example of the hardware configuration of the calibration work support device 10 according to the embodiment.

The calibration work support device 10 includes a central processing unit (CPU) 11, a random access memory (RAM) 12, a read only memory (ROM) 13, a hard disk drive (HDD) 14, a touch panel 15, a communication interface (I/F), and a communication I/F 17.

The calibration work support device 10 is a general-purpose device such as a server device, a desktop type PC or a tablet type PC, or a device dedicated to calibration work support. The calibration work support device 10 executes the calibration work support program described with reference to FIG. 2.

The CPU 11 controls the calibration work support device 10 by executing the calibration work support program stored in the RAM 12, the ROM 13, or the HDD 14. The calibration work support program is acquired, for example, from a recording medium on which the calibration work support program is recorded or from a program distribution server via the network, installed in the HDD 14, and stored in the RAM 12 so that the calibration work support program can be read from the CPU 11.

The touch panel 15 has an operation display function having an operation input function and a display function. The touch panel 15 enables an operator to input an operation using a fingertip, a touch pen, or the like. Although the case in which the calibration work support device 10 uses the touch panel 15 having the operation display function will be described in the embodiment, the calibration work support device 10 may individually have a display device having a display function and an operation input device having an operation input function. In this case, a display screen of the touch panel 15 can be implemented as a display screen of a display device, and an operation of the touch panel 15 can be implemented as an operation of the operation input device. Note that the touch panel 15 may be realized in various forms such as a head mount type, glasses type, or wristwatch type display. Note that the data output unit 107 may output display data to the head mount type, glasses type, or wristwatch type display, or the like.

The communication I/F 16 controls communication with the pressure calibrator 30. The communication I/F 17 controls communication with the pressure gauge 20. The communication I/F 17 controls field communication that is used for communication with the field device, for example.

Figure 4:
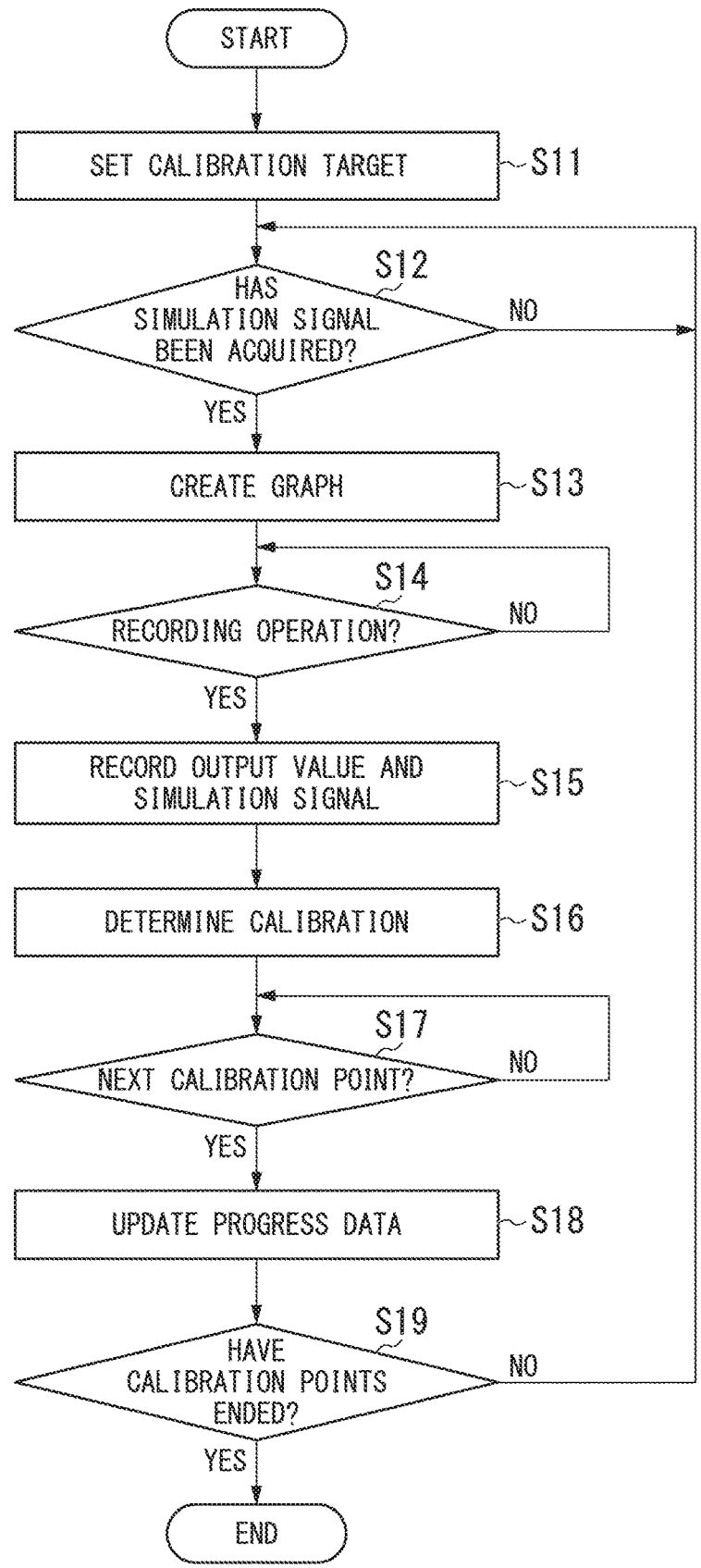
FIG. 4 is a flowchart illustrating an example of an operation of the calibration work support device in the embodiment.

Next, an operation of the calibration work support device 10 will be described with reference to FIG. 4. FIG. 4 is a flowchart illustrating an example of the operation of the calibration work support device 10 according to the embodiment.

In FIG. 4, the calibration work support device 10 performs a calibration target setting process (step S11). In the calibration target setting process, the calibration work support device 10 enables setting of a target value of the simulation signal that is input to a device in calibration of the device, and an input order of the target value in the calibration. Note that the process in step S11 may be skipped when previously set content is continuously used. The set content may be stored in the data storage 106, for example.

After the process of step S11 is executed, the calibration work support device 10 determines whether or not the simulation signal has been acquired (step S12). The acquisition of the simulation signal can be executed, for example, by the simulation signal acquirer 102 acquiring an input value (a serial signal) output from the pressure calibrator 30. In the embodiment, the output value acquired from the pressure gauge 20 is acquired together with the input value based on the simulation signal through serial communication as described above. That is, when it is determined that the input value has been acquired in step S12, the output value is also acquired. Note that the pressure calibrator 30 may perform noise removal on the input value through averaging or the like. The simulation signal acquirer 102 may use an input value from which noise has been removed, which is output from the pressure calibrator 30. When it is determined that the simulation signal has not been acquired (step S12: NO), the calibration work support device 10 repeats the process of step S12 and waits for acquisition of the simulation signal.

On the other hand, when it is determined that the simulation signal has been acquired (step S12: YES), the calibration work support device 10 generates a graph on the basis of the acquired input value based on the simulation signal (step S13). When the simulation signal is acquired in the process of step S12, a newly acquired input value (point) is added to the graph generated in the graph generator 104. The graph generated in the graph generator 104 indicates the transition of the input value by repeating the updating of the input value based on the simulation signal. Note that the generation of the graph in the process of step S13 may be executed when a predetermined number of input values are acquired.

After the process of step S13 is executed, the calibration work support device 10 determines whether or not a recording operation has been performed (step S14). It can be determined whether or not a recording operation has been performed, for example, on the basis of whether or not the operation unit 108 detects pressing of the button "Record" by the maintenance worker. When it is determined that the recording operation is not performed (step S14: NO), the calibration work support device 10 repeats the process of step S14 and waits for the execution of the recording operation.

On the other hand, when it is determined that the recording operation has been performed (step S14: YES), the calibration work support device 10 instructs the pressure calibrator 30 to record, using a control signal, the output value output from the pressure gauge 20, and adds a mark indicating that the calibration point has been recorded, to the graph generated in the graph generator 104 (step S15). The addition of the mark to the graph can be executed, for example, by the graph generator 104 adding a predetermined mark to the displayed graph. By adding the mark indicating that the calibration point has been recorded to the graph, the maintenance worker can visually recognize that acquisition of the output value at the calibration point is completed and can recognize that movement to the next calibration point can be performed. Note that in the process of step S15, a predetermined mark may be added to the value of the simulation signal when the recording operation with respect to the displayed graph is performed, and the output value acquired together with the simulation signal may be recorded or displayed in the calibration work support device 10.

After the process of step S15 is executed, the calibration work support device 10 makes a determination regarding the calibration at the calibration point (step S16). The calibration determiner 111 performs, for example, the determination regarding the calibration on the basis of the input value based on the simulation signal acquired by the simulation signal acquirer 102 and the output value of the pressure gauge 20 acquired by the output value acquirer 103. The calibration determiner 111 generates the reference value for calibration that can be compared with the output value on the basis of the acquired input value, determines whether or not a difference (error) between the generated reference value and the acquired output value is in the allowable range, and generates a determination result of "PASS" or "FAIL". Note that although the case in which the process of step S16 is performed only once when it is determined that the recording operation is performed in the process of step S14, the process of step S16 may be executed each time the recording operation is performed. When the recording operation is performed a plurality of times at one calibration point, the determination regarding the calibration may be made on the basis of the input value and the output value acquired in the last recording operation.

After the process of step S16 is executed, the calibration work support device 10 determines whether or not an instruction of shift (a progress operation) to the next calibration point has been issued (step S17). Whether or not an instruction to shift to the next calibration point has been issued can be determined, for example, on the basis of whether or not the operation unit 108 has detected that the maintenance worker has pressed a button for shift to the "next calibration point". When it is determined that an instruction to move to the next calibration point has not been issued (step S17: NO), the calibration work support device 10 repeats the process of step S17 and waits for input of a movement instruction.

On the other hand, when it is determined that the instruction to shift to the next calibration point is issued (step S17: YES), the calibration work support device 10 updates the progress data (step S18). The progress data can be updated, for example, in the progress data generator 105. As described above, the progress data generator 105 generates display data that allows to which of the calibration points the recording has been completed to be seen. For example, when the instruction to shift to the next calibration point is issued, the progress data generator 105 displays the next calibration point and requests the maintenance worker to operate the pressure generator 31. Note that since the calibration point is set together with the ascending or descending pattern, reacquisition of the output value after returning to an immediately previous calibration point may not be performed, for example. Note that the determination result generated in step S16 may be included in the progress data and updated.

After the process of step S18 is executed, the calibration work support device 10 determines whether all the calibration points have been completed (step S19). For example, when the calibration target setter 101 sets the number of calibration points to five and recording of the output value of the pressure gauge 20 at the five calibration points ends, it is determined that the calibration points have ended. When it is determined that the calibration points have not ended (step S19: NO), the calibration work support device 10 returns to the process of step S12 and repeatedly executes the processes of steps S12 to S19. On the other hand, when it is determined that the calibration points have ended (step S19: YES), the calibration work support device 10 ends the operation shown in the flowchart.

Note that although the case in which the processes of steps S14 and S17 are iteratively performed has been described with reference to in FIG. 4, the process of step S14 or S17 may be stopped and the process shown in the flowchart may be interrupted, for example, when there has been no input within a predetermined time. Further, an interrupted calibration process may be resumed. For example, the calibration work support device 10 stores a calibration history before the interruption. When the input of the simulation signal is interrupted due to the interruption of the calibration process, the calibration work support device 10 can store the interruption of the input of the simulation signal using the stored calibration history. The calibration work support device 10 resumes storing of the restarted calibration history when the input of the simulation signal is restarted. Therefore, for example, even when the maintenance worker interrupts the calibration process, the process can be resumed.

Further, although the acquisition of the output value at the calibration point and the updating of the progress data have been described with reference to FIG. 4, the calibration result may be output from the data output unit 107 at any timing. Further, the device adjuster 110 may adjust the pressure gauge 20 on the basis of the calibration result.

Figure 5:
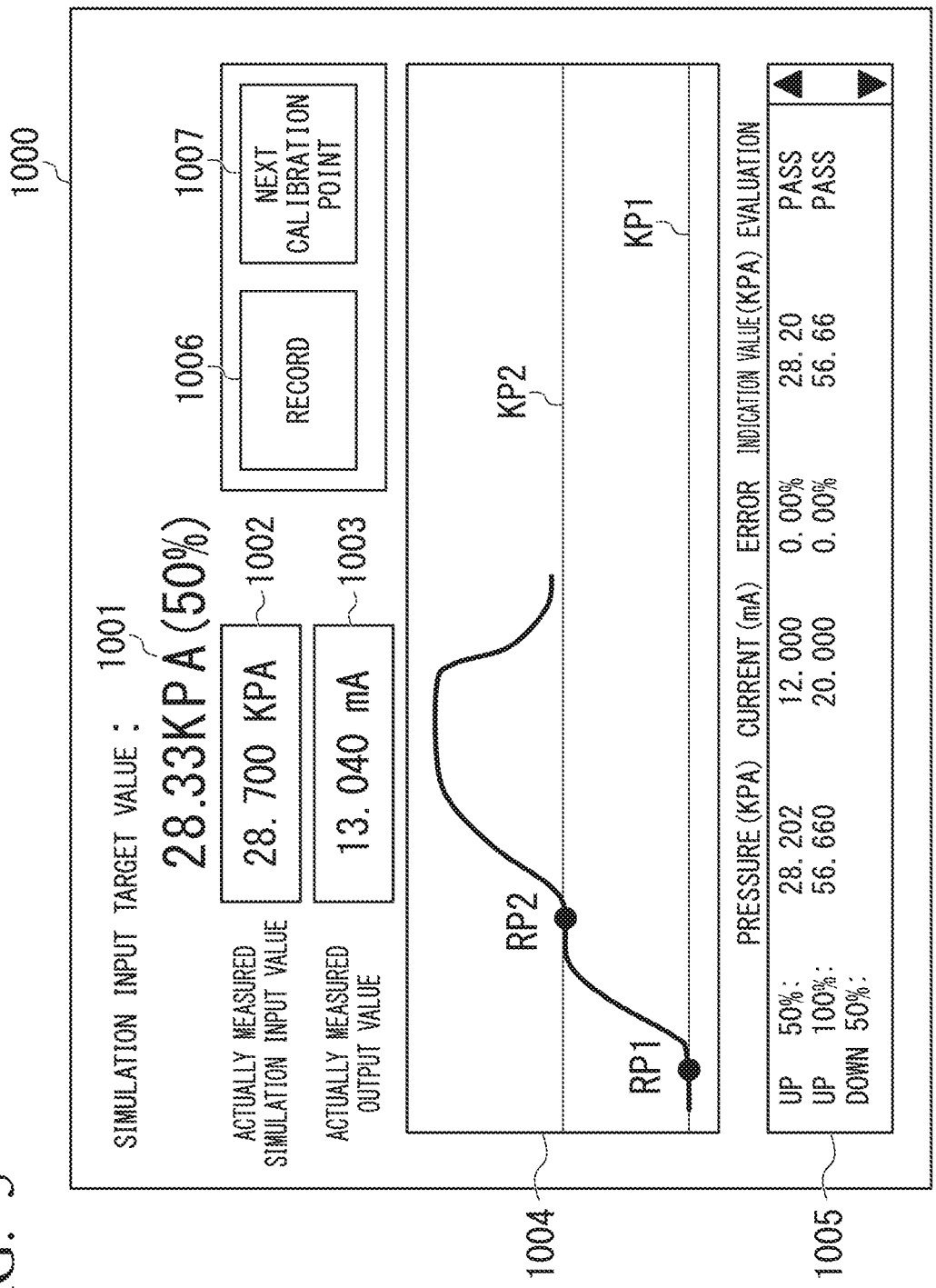
FIG. 5 is a diagram illustrating an example of a display of a display screen of the calibration work support device in the embodiment.

Next, a display of the display screen of the calibration work support device 10 will be described with reference to FIG. 5. FIG. 5 is a diagram illustrating an example of the display of the display screen of the calibration work support device 10 according to the embodiment.

In FIG. 5, a display area 1000 is, for example, a display area that is included in the display data output from the data output unit 107 and displayed on the display screen of the touch panel 15. The display area 1000 includes a display area 1001 to a display area 1007.

The display area 1001 displays the input target value of the simulation signal at the next calibration point. FIG. 5 illustrates a case in which the target input value of 50% is 28.33 KPA. That is, the maintenance worker operates a handle of the pressure generator 31 to generate pressure of 28.33 KPA. The display area 1001 displays a new numerical value when the calibration point shifts.

The display area 1002 displays an actually measured input value of the simulation signal. The actually measured input value of the simulation signal is displayed by the simulation signal acquirer 102 acquiring the input value acquired from the pressure calibrator 30. FIG. 5 illustrates that the actually measured input value is 28.700 KPA and substantially matches the target value of 28.33. Note that when the difference between the actually measured input value and the input target value is in a predetermined range, there is no problem in the calibration.

The display area 1003 displays an actually measured output value of the pressure gauge 20. The actually measured output value is an actually measured value corresponding to the actually measured input value of the simulation signal. The actually measured output value indicates an output value at a current output of 4 to 20 mA. The actually measured output value of the pressure gauge 20 is input to the pressure calibrator 30 and is acquired by the output value acquirer 103 together with the input value based on the simulation signal.

The display area 1004 is an area in which a graph showing the actually measured input value of the simulation signal with the elapse of time of is displayed. The display of the graphs or the like displayed in the display area 1004 is generated by the graph generator 104. In the display area 1004, a horizontal line indicated by KP1 indicates the input target value at the first calibration point (0%). Further, a horizontal line indicated by KP2 indicates the input target value at the second calibration point (50%). The graph shows the actually measured input value.

A mark (a black circle) of RP1 on the graph is an actually measured input value when the actually measured output value has actually been recorded with respect to the input target value at the first calibration point. That is, the display of the mark of RP1 indicates that the recording of the actually measured output value at the first calibration point has been completed. Further, a mark (a black circle) of RP2 on the graph is an actually measured input value when the actually measured output value has actually been recorded with respect to the input target value at the second calibration point. That is, the display of the mark of RP2 indicates that the recording of the actually measured output value at the second calibration point has been completed.

Since a maintenance worker can see transitions of the actually measured input value using the graph displayed in the display area 1004, the maintenance worker can perform an appropriate number of operations or amount of operation for the pressure generator 31, or the like. Note that the display of the graph displayed in the display area 1004 is not performed in the process of step S13 and, for example, a display aspect or the like may be changed when the graph approaches the horizontal line of the n-th calibration point indicated by (KPn).

In addition, in FIG. 5, only the graph of the actually measured input value is shown, but it is also possible to display a graph of input measured values recorded in the past, for example. For example, an example graph (model graph) illustrating the actually measured input value implemented by a skilled worker, which has been recorded in the past, is displayed together, and accordingly, a new maintenance worker can trace an operation of the skilled worker by operating the pressure generator 31 to trace the displayed example graph. Note that the data storage 106 may store the example graph in the form of a graph and may store the actually measured input value in the past as a value and generate the example graph on the basis of the actually measured input value stored by the graph generator 104.

The display area 1005 displays numerical values recorded at the calibration points. The display area 1005 displays the actually measured input value, the actually measured output value, an error of the actually measured output value, the input value displayed on the display included in the pressure gauge 20, and the determination result for the calibration. The determination result is determined on the basis of whether or not the error of the actually measured output value is in a predetermined range that is determined in advance. In the display area 1005, "PASS" is displayed in "Evaluation" when the determination result is "pass". The maintenance worker can recognize a progress situation of the calibration work by viewing the display area 1005. That is, a calibration point at which a value and a determination result of passing or failing are displayed indicates completion, and the calibration point at which each value and the pass or fail of the determination result are not displayed is incompletion (in FIG. 5, down 50% is incompletion). Note that, in the display area 1005, when the number of calibration points is large, scrolling display can be performed.

The display area 1006 displays an operation switch "Record" so that the operation switch can be operated. The switch "Record" is operated by the maintenance worker. When the switch "Record" is pressed, the actually measured output value at the calibration point is recorded. The pressing of the switch "Record" is detected by the operation unit 108 and output as a control signal to the pressure calibrator 30. By disposing the operation switch "Record" together with the graph of the actually measured input value in the display area 1000, it is possible to facilitate an operation while confirming the graph.

The display area 1007 displays an operation switch "Next calibration point (hereinafter abbreviated as "Next") so that the operation switch can be operated. The switch "Next" is a progress operation that is operated by the maintenance worker. When the switch "Next" is pressed, the calibration point transitions to the next calibration point. The pressing of the switch "Next" is detected by the operation unit 108 and output as a control signal to the pressure calibrator 30.

As described above, the calibration work support device according to the embodiment includes a calibration target setter that enables setting a target value of a simulation signal that is input to a device in calibration of the device and an input order of the target value in the calibration, a simulation signal acquirer that acquires an input value based on the simulation signal input to the device, a graph generator that generates a graph indicating a transition of the set target value and the acquired input value, a progress data generator that generates progress data indicating a progress situation of the calibration in the set input order, and a data output unit that outputs the generated graph and the generated progress data. Through this calibration, calibration accuracy and work efficiency can be improved.

Note that the above-described calibration work support device may be a device having the above-described function, and may be a device that is realized by, for example, a system configured of a combination of a plurality of devices in which the respective devices are connected to each other. Further, the calibration work support device may be realized as some of functions of another device connected via a network.

Furthermore, in the embodiment, a case in which a pressure gauge (a pressure transmitter) is calibrated for calibration of a device has been illustrated, but the device in which the embodiment is realized is not limited to a pressure gauge. For example, this embodiment can also be implemented in calibration of a device such as a flow meter, a level meter, a temperature transmitter, or analyzer. In this case, as the simulation signal, a simulation signal indicating a flow rate, a level, a temperature, or the like can be used. Further, the embodiment is not limited to the calibration of an input device that inputs data to a control device for a pressure gauge, a flow meter, or the like, and can also be implemented in calibration of an output device that operates on the basis of data output from a control device for a valve positioner, an electro-pneumatic positioner, an electro-pneumatic converter, or the like. For example, when the embodiment is implemented in the valve positioner, an operation signal that is output to the valve positioner may be acquired as the simulation signal, a valve opening degree may be set as a target value, and a graph of the operation signal may be generated.

Further, "acquire" in the embodiment may be "acquire" from another device or may be "acquire" from another functional unit in the same device. Further, "output" in the embodiment may be "output" from another device or may be "output" from another functional unit in the same device. For example, the simulation signal acquirer may acquire the input value based on the simulation signal from another device or may acquire a numerical value of the simulation signal generated with respect to a device that generates the simulation signal, as the input value based on the simulation signal, from another functional unit in the calibration work support device. Similarly, the data output unit may output the display data to the display device included in the calibration work support device or may output the display data to another device such as a head mount type display.

Further, a calibration work support method in the embodiment includes a calibration target setting step of enabling setting a target value of a simulation signal that is input to a device in calibration of the device and an input order of the target value in the calibration, a simulation signal acquisition step of acquiring an input value based on the simulation signal input to the device, a graph generation step of generating a graph indicating a transition of the set target value and the acquired input value, and a data output step of outputting the generated graph. Through this calibration, calibration accuracy and work efficiency can be improved.

Note that the respective steps in the calibration work support method or the respective processes in the calibration work support program and the recording medium described in the embodiment are not limited in execution order.

Further, various processes of the embodiment described above may be performed by recording a program for realizing the functions of the device described in the embodiment in a computer-readable recording medium, loading the program recorded on the recording medium to a computer system, and executing the program. Note that the "computer system" referred to herein may include an OS or hardware such as a peripheral device. Further, the "computer system" also includes a homepage providing environment (or a display environment) when a WWW system is used. Further, the "computer-readable recording medium" refers to a flexible disk, a magneto-optical disc, a ROM, or a writable nonvolatile memory such as a flash memory, a portable medium such as a CD-ROM, or a storage device such as a hard disk built into the computer system.

Further, the "computer-readable recording medium" also includes a recording medium that holds a program for a certain time, such as a volatile memory (dynamic random access memory (DRAM)) inside a computer system including a server and a client when a program is transmitted via a network such as the Internet or a communication line such as a telephone line. Further, the above program may be transferred from a computer system in which the program is stored in a storage device or the like to other computer systems via a transmission medium or by transmission waves in the transmission medium. Here, the "transmission medium" for transmitting the program refers to a medium having a function of transferring information, such as a network (communication network) such as the Internet or a communication line such as a telephone line. Further, the above program may be a program for realizing some of the above-described functions. Further, the program may be a program capable of realizing the above-described functions in combination with a program previously stored in a computer system, that is, a differential file (a differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A calibration work support device that is connected to a field device and an acquiring device, the field device measuring a physical quantity in a plant, the acquiring device acquiring an input value based on a simulation signal for calibration input from a simulation signal generator to the field device, the calibration work support device comprising:
    a calibration target setter configured to set a target value of the simulation signal that is input from the simulation signal generator to the field device in the calibration of the field device and an input order of the target value in the calibration;
    a simulation signal acquirer configured to acquire, from the acquiring device, the input value based on the simulation signal input to the field device;
    a graph generator configured to generate a graph indicating the target value set by the calibration target setter and a transition with elapse of time of the input value acquired by the simulation signal acquirer; and
    a data output unit configured to output the graph generated by the graph generator.

2. The calibration work support device according to claim 1, further comprising:
    a progress data generator configured to generate progress data indicating a progress situation of the calibration in the input order set by the calibration target setter,
    wherein the data output unit further outputs the progress data generated by the progress data generator.

3. The calibration work support device according to claim 2,
    wherein the progress data generator generates the progress data in a list form of an input schedule and an input result of the simulation signal.

4. The calibration work support device according to claim 1, further comprising:
    an operation unit that is used for performing a recording operation of recording an output value that is output from the field device in accordance with the simulation signal; and
    an instruction unit configured to instruct recording of the output value when the recording operation is performed.

5. The calibration work support device according to claim 4,
    wherein the operation unit is used for performing a progress operation for progressing the calibration in the input order, and
    wherein the instruction unit instructs progress of the calibration when the progress operation is performed.

6. The calibration work support device according to claim 1, further comprising:
    an output value acquirer configured to acquire an output value that is output from the field device in accordance with the simulation signal input to the field device,
    wherein the data output unit further outputs the output value acquired by the output value acquirer.

7. The calibration work support device according to claim 1, further comprising:
    a data storage that stores a calibration history in which at least one of the target value set by the calibration target setter, the input order set by the calibration target setter, the input value acquired by the simulation signal acquirer, or the graph generated by the graph generator is combined with information on the field device.

8. The calibration work support device according to claim 7,
    wherein the data output unit outputs the calibration history stored in the data storage.

9. The calibration work support device according to claim 7,
    wherein the data storage further stores an example graph showing a transition of the input value, and
    wherein the graph generator generates the graph for displaying the example graph stored in the data storage together with the target value.

10. The calibration work support device according to claim 7,
    wherein the data storage further stores interruption of an input of the simulation signal and resumes storage of the calibration history resumed when the input of the simulation signal is resumed.

11. The calibration work support device according to claim 1,
    wherein the graph generator adds a mark indicating that the input value has been acquired at the target value to the graph.

12. A calibration work support method performed by a calibration work support device that is connected to a field device and an acquiring device, the field device measuring a physical quantity in a plant, the acquiring device acquiring an input value based on a simulation signal for calibration input from a simulation signal generator to the field device, the calibration work support method comprising:
    setting, by a calibration target setter, a target value of the simulation signal that is input from the simulation signal generator to the field device in the calibration of the field device and an input order of the target value in the calibration;
    acquiring, by a simulation signal acquirer, from the acquiring device, the input value based on the simulation signal input to the field device;
    generating, by a graph generator, a graph indicating the target value set by the calibration target setter and a transition with elapse of time of the input value acquired by the simulation signal acquirer; and
    outputting, by a data output unit, the graph generated by the graph generator.

13. The calibration work support method according to claim 12, further comprising:
    generating, by a progress data generator, progress data indicating a progress situation of the calibration in the input order set by the calibration target setter; and
    outputting, by the data output unit, the progress data generated by the progress data generator.

14. The calibration work support method according to claim 13, further comprising:

generating, by the progress data generator, the progress data in a list form of an input schedule and an input result of the simulation signal.

15. The calibration work support method according to claim 12, further comprising:

performing, by using an operation unit, a recording operation of recording an output value that is output from the field device in accordance with the simulation signal; and instructing, by an instruction unit, recording of the output value when the recording operation is performed.

16. The calibration work support method according to claim 15, further comprising:

performing, by using the operation unit, performing a progress operation for progressing the calibration in the input order; and instructing, by the instruction unit, progress of the calibration when the progress operation is performed.

17. The calibration work support method according to claim 12, further comprising:

acquiring, by an output value acquirer, an output value that is output from the field device in accordance with the simulation signal input to the field device; and outputting, by the data output unit, the output value acquired by the output value acquirer.

18. The calibration work support method according to claim 12, further comprising:

storing, into a data storage, a calibration history in which at least one of the target value set by the calibration target setter, the input order set by the calibration target setter, the input value acquired by the simulation signal acquirer, or the graph generated by the graph generator is combined with information on the field device.

19. The calibration work support method according to claim 18, further comprising:

outputs, by the data output unit, the calibration history stored in the data storage.

20. A non-transitory computer readable storage medium storing one or more calibration work support programs configured for execution by a calibration work support device that is connected to a field device and an acquiring device, the field device measuring a physical quantity in a plant, the acquiring device acquiring an input value based on a simulation signal for calibration input from a simulation signal generator to the field device, the one or more calibration work support programs comprising instructions for:

setting a target value of the simulation signal that is input from the simulation signal generator to the field device in the calibration of the field device and an input order of the target value in the calibration;

acquiring, from the acquiring device, the input value based on the simulation signal input to the field device;

generating a graph indicating the target value which has been set and a transition with elapse of time of the input value which has been acquired; and outputting the graph which has been generated.

* * * * *